(12) United States Patent
Dolsak

(10) Patent No.: US 8,878,526 B2
(45) Date of Patent: Nov. 4, 2014

(54) MAGNETIC ENCODER APPARATUS

(75) Inventor: Gregor Dolsak, Velike Lasce (SI)

(73) Assignees: Renishaw PLC, Wotton-under-Edge (GB); RLS Merilna Tehnika D.O.O., Ljubljana (SI)

( * ) Notice: Subject to any disclaimer, the term of this patent is extended or adjusted under 35 U.S.C. 154(b) by 414 days.

(21) Appl. No.: 13/144,030

(22) PCT Filed: Jan. 21, 2010

(86) PCT No.: PCT/GB2010/000092
§ 371 (c)(1),
(2), (4) Date: Jul. 11, 2011

(87) PCT Pub. No.: WO2010/086585
PCT Pub. Date: Aug. 5, 2010

(65) Prior Publication Data
US 2011/0267043 A1    Nov. 3, 2011

Related U.S. Application Data

(60) Provisional application No. 61/202,074, filed on Jan. 27, 2009.

(30) Foreign Application Priority Data
Mar. 2, 2009   (GB) .................................. 0903536.1

(51) Int. Cl.
*G01R 33/00*   (2006.01)
*G01D 5/245*   (2006.01)

(52) U.S. Cl.
CPC ..................................... *G01D 5/2455* (2013.01)
USPC ..................................................... 324/207.24

(58) Field of Classification Search
None
See application file for complete search history.

(56) References Cited

U.S. PATENT DOCUMENTS

| 4,009,377 A | 2/1977 | Elms |
| 5,004,982 A | 4/1991 | Chaney et al. |

(Continued)

FOREIGN PATENT DOCUMENTS

| CN | 1461404 A | 12/2003 |
| DE | 101 04 855 A1 | 5/2002 |

(Continued)

OTHER PUBLICATIONS

Chinese Office Action issued in Chinese Application No. 201080005716.0 dated Apr. 2, 2013 (w/ translation).

(Continued)

*Primary Examiner* — Arleen M Vazquez
*Assistant Examiner* — Feba Pothen
(74) *Attorney, Agent, or Firm* — Oliff PLC

(57) ABSTRACT

A magnetic scale includes a scale member having a plurality of grooves. The scale member defines a passive magnetic scale track. The plurality of grooves include grooves of at least a first groove type and a second groove type, the magnetic properties of the scale member in the locality of grooves of the first groove type being different than the magnetic properties of the scale member in the locality of grooves of the second groove type. The scale member is arranged to carry or encode absolute position information in the form of at least one codeword comprising a sequence of data bits, wherein each of the data bits is provided by a groove of the scale member, the data bit taking a first value if the groove is of the first groove type and a second value if the groove is of the second groove type.

15 Claims, 4 Drawing Sheets

(56) References Cited

U.S. PATENT DOCUMENTS

Figure 1:
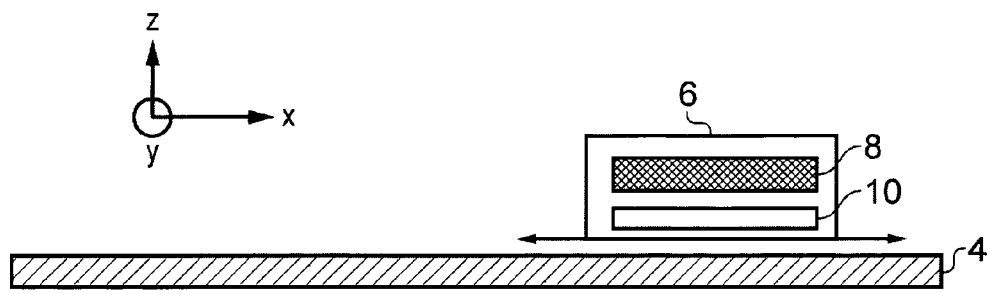

| | | | |
|---|---|---|---|
| 5,279,044 A | | 1/1994 | Bremer |
| 5,336,586 A | | 8/1994 | Togawa et al. |
| 5,461,311 A | * | 10/1995 | Nakazato et al. ........ 324/207.24 |
| 5,497,083 A | | 3/1996 | Nakazato et al. |
| 5,539,993 A | | 7/1996 | Kilpinen et al. |
| 5,929,789 A | | 7/1999 | Barbehenn |
| 6,127,948 A | | 10/2000 | Hillis et al. |
| 6,268,721 B1 | | 7/2001 | Schroeder et al. |
| 6,404,188 B1 | * | 6/2002 | Ricks ....................... 324/207.22 |
| 6,822,219 B1 | | 11/2004 | Braun |
| 6,874,244 B2 | | 4/2005 | Birrer et al. |
| 7,148,817 B2 | | 12/2006 | Muller |
| 7,388,368 B2 | * | 6/2008 | Legrand et al. .......... 324/207.25 |
| 7,543,488 B2 | * | 6/2009 | Staudenmann et al. ... 73/117.02 |
| 7,999,533 B2 | * | 8/2011 | LaCroix ................... 324/207.12 |
| 2004/0155800 A1 | | 8/2004 | Ymker |
| 2007/0170913 A1 | | 7/2007 | Yokotani et al. |

FOREIGN PATENT DOCUMENTS

| | | |
|---|---|---|
| EP | 0 503 716 A1 | 9/1992 |
| FR | 2 495 327 A1 | 6/1982 |
| GB | 2 096 421 A | 10/1982 |
| JP | A-5-52590 | 3/1993 |
| JP | A-7-260513 | 10/1995 |
| JP | A-2002-521684 | 7/2002 |
| JP | A-2004-286662 | 10/2004 |
| WO | WO 88/06717 A1 | 9/1988 |
| WO | WO 93/20403 | 10/1993 |
| WO | WO 00/06973 A1 | 2/2000 |
| WO | WO 02/084223 A1 | 10/2002 |

OTHER PUBLICATIONS

Japanese Office Action issued in Japanese Patent Application No. 2011-546938 dated May 28, 2013 (w/ translation).
British Search Report in British Application No. GB0903536.1; dated Aug. 3, 2009.
International Search Report in International Application No. PCT/GB2010/000092; dated Jun. 1, 2010.
Written Opinion of the International Searching Authority in International Application No. PCT/GB2010/000092;dated Jun. 1, 2010.
Chinese Office Action issued in Chinese Patent Application No. 201080005716.0 dated Nov. 12, 2013 (w/ partial translation).
Jul. 22, 2014 Japanese Office Action issued in Japanese Patent Application No. 2011-546938 (with English Translation).

* cited by examiner

MAGNETIC ENCODER APPARATUS

The present invention relates to magnetic encoder apparatus and in particular to a passive magnetic scale track comprising a series of grooves formed in a magnetic scale member.

Many different types of position encoder are known. These include optical systems in which a scale comprising light and dark lines is read by an optical readhead. Magnetic encoders are also known in which the varying magnetic properties of a scale are read by a readhead unit that comprises one or more magnetic (e.g. Hall) sensors.

Incremental and absolute encoder arrangements are known. Incremental encoders typically read an associated scale comprising a regularly repeating pattern that allows any relative movement between the scale and readhead to be measured. Absolute encoder arrangements read a scale comprising a non-periodic sequence of scale markings that encode a series of unique codewords from which the absolute position of the readhead relative to the scale is determined.

It is also known to provide encoder scales that comprise an incremental scale track adjacent an absolute (coded) track. The higher positional accuracy that can typically be obtained from an incremental encoder system can then be combined with the benefits associated with being able to measure absolute position, such as the ability to quickly determine position on powering up the device without requiring any relative movement. It has also been described previously, for example see U.S. Pat. No. 5,279,044 and WO2002/084223, how absolute data can be embedded in an incremental scale track. In particular, these documents describe an optical scale that is provided with a series of optical (light and dark) lines. Certain of these lines are omitted from the incremental scale to provide data bits that encode information related to absolute position in the form of discrete codewords or a pseudo-random code. The use of teeth of different widths to encode absolute angular position is described in DE10104855.

U.S. Pat. No. 5,461,311 describes an incremental magnetic encoder in which scale markings are formed as non-magnetic regions located in a rod of magnetic material. A pair of spaced apart magnetic sensors detect any incremental motion of the rod. In one embodiment, first and second magnetic parts of different depths are used to provide position reference marks (or home positions) at one or a few points along the scale. This allows a reference position(s) to be established when a reference mark of the scale is moved past the magnetic sensors.

According to a first aspect of the present invention, a magnetic scale for magnetic encoder apparatus, comprises;

a scale member comprising a plurality of grooves, the scale member defining a passive magnetic scale track that can be read by an associated magnetic scale reader unit, the plurality of grooves comprising grooves of at least a first groove type and a second groove type, the magnetic properties of the scale member in the locality of grooves of the first groove type being different than the magnetic properties of the scale member in the locality of grooves of the second groove type, wherein the scale member carries absolute position information in the form of at least one codeword comprising a sequence of data bits, wherein each of the data bits is provided by a groove of the scale member, the data bit taking a first value if the groove is of the first groove type and a second value if the groove is of the second groove type, wherein the midpoints of the plurality of grooves are substantially equidistantly spaced apart along the length of the scale member.

The present invention thus provides a passive magnetic scale track, that can be read by an associated magnetic scale reader unit, in which at least two different types of groove are formed. Grooves of a first groove type are arranged to alter the local magnetic properties of the scale member differently to grooves of the second groove type. It should be noted that a "passive" magnetic scale track is not magnetised in any way but has local magnetic permeability variations that affect the magnetic field generated by the magnet of an associated magnetic scale reader unit. This should be contrasted to "active" magnetic scales in which north and south magnetic poles are embedded.

The different groove types formed in the scale member are used to encode different data bit values (e.g. logical "1"s and "0"s) in the scale member. In this manner, each groove of the scale defines a data bit, the data bit taking a first value (e.g. "0") if the groove is of the first groove type and a second value (e.g. "1") if the groove is of the second groove type. A series or sequence of such data bits (i.e. a series of grooves) is then used to form a codeword (i.e. by forming an appropriate pattern of different types of groove) that describes a unique or absolute position on the scale member. A plurality of such codewords can be formed along the scale member. In this manner, absolute position data can be embedded in the scale whilst the general pattern of grooves may be used to obtain incremental position data.

The present invention thus overcomes the need to provide separate, side-by-side, incremental and absolute scale tracks to combine the accuracy advantages of incremental measurements with the ability of being able to determine absolute position. Instead, a single scale track is used to provide both the absolute and incremental information. As summarised above, the present Applicant has outlined previously in WO2002/084223 (which predominantly describes optical based encoder systems) how absolute data may be embedded in an incremental scale track. The present inventors have, however, recognised how a combined absolute and incremental passive magnetic encoder arrangement can be advantageously implemented by providing grooves of different groove types. For example, grooves of different depth, width or profile may be used to provide multiple levels of scale mark coding. Providing different types of groove in this manner reduces the degradation of the incremental signal that can result if some grooves are omitted to encode the necessary data whilst still allowing bits of absolute data to be extracted.

The present invention encodes absolute position data in the form of codewords and is thus advantageous over incremental system of the type described in U.S. Pat. No. 5,461,311 in which reference marks are located at one or a few positions along the scale. In particular, as described below, the absolute position codewords of the present invention can be read by a multiple element magnetic scale reader unit without (unlike U.S. Pat. No. 5,461,311) requiring any movement of the scale relative to the scale reader unit. The absolute position of the scale can thus be determined whenever required, e.g. on power up etc without any requirement to move the scale reader unit relative to the scale.

Furthermore, the midpoints of the plurality of grooves are substantially equidistantly spaced apart along the length of the scale member. In this manner, and unlike the rotary encoder described in DE10104855, a repetitive pattern of grooves is formed on the scale member from which incremental (Sin/Cos) signals can be extracted. As there are preferably no grooves missing from the scale member, the amplitude of these incremental signals is not significantly reduced compared with a purely incremental scale that has a regular, repeating, pattern of identical grooves.

As outlined above, grooves of the first groove type have a different influence on an applied magnetic field than grooves of the second groove type thus allowing the different groove types to be sensed. Preferably, grooves of the first groove type have a different depth than grooves of the second groove type. Advantageously, grooves of the first groove type have a different width than grooves of the second groove type. Conveniently, grooves of the first groove type have a different shape or cross-sectional profile than grooves of the second groove type. Each groove type may be provided as a single trench or may comprise a series of sub-grooves. For example, a first series of indentations (e.g. dots) or fine sub-grooves may collectively form a groove of a first groove type and a second series of indentations or fine sub-grooves may collectively form a groove of a second groove type.

Advantageously, grooves of the first groove type may be filled with a different material than grooves of the second type. For example, infill material of a first magnetic permeability may fill grooves of the first groove type and infill material of a second magnetic permeability may fill grooves of the second groove type. In such an example, the grooves may be physically identical and the different influence on applied magnetic field be provided by the different magnetic permeability of the material with which they are filled.

Conveniently, the magnetic scale comprises a plurality of binary data bits. A groove of the first groove type may define a binary data bit having a logical "1" value. A groove of the second groove type may then define a binary data bit having a logical "0" value. The logical value associated with a particular groove type can be arbitrarily selected. In this manner, the different groove types are used to encode binary data.

The scale may provide at least one codeword in the form of a binary codeword from a series of at least two (e.g. adjacent) binary data bits. Advantageously, a plurality of such binary codewords are formed from a series of at least two binary data bits. Each binary codeword conveniently describes a unique position on the magnetic scale. In other words, the codewords may provide absolute position information. The codewords may be discrete (i.e. non-overlapping) codewords or may be formed as a pseudo-random code in which the unique codewords overlap.

It should be noted that although the above description refers to first and second groove types that allow binary data to be encoded, the invention could make use of grooves of a third groove type or further groove types. In this manner, each groove could define any one of three or more different states. Such an arrangement could be used to reduce the length of codeword required to define an absolute position.

Preferably, the scale member comprises magnetic material. For example, the scale member may be formed from a ferromagnetic material such as steel. Advantageously, the scale member is substantially elongate to provide a linear (not rotary) magnetic scale. The scale member may comprise a substantially flat or elongate linear substrate. Advantageously, the scale member comprises a rod or a wire having a substantially circular cross-section. Each of the plurality of grooves may extend circumferentially around the rod or wire. As explained below, providing a scale member of the present invention in the form of rod (e.g. a steel rod) allows its use in a hydraulic cylinder or the like.

The plurality of grooves may be empty. In other words, no solid material may be used to fill the grooves. Advantageously, the plurality of grooves are at least partially filled with one or more materials. Preferably, any material filling the grooves has different magnetic properties to that of the scale member. For example, a non-magnetic material may be used to fill grooves formed in a magnetic (e.g. ferromagnetic) scale member.

Encoder apparatus (e.g. linear encoder apparatus) may advantageously be provided in accordance with the present invention that comprises a magnetic scale of the type described above. Such encoder apparatus may also comprise a magnetic scale reader unit. The magnetic scale reader unit preferably comprises a magnet and a plurality of magnetic field strength (e.g. Hall effect) sensors. At least 4, 8, 10, 16, 20 or 31 magnetic field strength sensors may be provided.

As outlined above, the midpoints of the grooves of the magnetic scale may be spaced apart by a bit length (L). The magnetic scale reader may conveniently comprise a plurality of spaced apart magnetic field strength sensors, the spacing of the magnetic field strength sensors being arranged so that M magnetic field strength sensors are provided per bit length, wherein M is an integer value greater than or equal to one. In other words, the pitch of the groove spacing may be a multiple of the pitch of the magnetic field strength sensors.

As outlined above, the magnetic scale preferably comprises a plurality of codewords, each codeword comprising N data bits defined by N spaced apart grooves. The plurality of spaced apart magnetic field strength sensors of the magnetic scale reader unit may then conveniently comprise sufficient magnetic field strength sensors to simultaneously read at least N data bits, wherein N is an integer value greater than or equal to two. Preferably, N is greater than 3, 4, 5, 6, 7 or 10. Advantageously, N is 13 or more.

As explained in more detail below, absolute and incremental (Sin/Cos) data may be generated from the signals produced by the plurality of magnetic field strength sensors. This data analysis may be performed by suitable processing circuitry. Advantageously, the encoder comprises circuitry to generate absolute and incremental data from the signals produced by the plurality of magnetic field strength sensors. Although the above arrangement may use the same sensors to measure incremental and absolute data, separate incremental and absolute sensors may alternatively be provided to read the same single track.

A magnetic scale for magnetic encoder apparatus is thus described herein. The magnetic scale comprising; a scale member comprising a plurality of grooves, said scale member defining a passive magnetic scale track encoding absolute position information that can be read by an associated magnetic scale reader unit, wherein the plurality of grooves of the scale member comprise grooves of at least a first groove type and a second groove type, wherein the magnetic properties of the scale member in the locality of grooves of the first groove type are different than the magnetic properties of the scale member in the locality of grooves of the second groove type.

A magnetic scale for magnetic encoder apparatus is thus described herein that comprises; a scale member comprising a plurality of grooves, the scale member defining a passive magnetic scale track that can be read by an associated magnetic scale reader unit, the plurality of grooves comprising grooves of at least a first groove type and a second groove type, the magnetic properties of the scale member in the locality of grooves of the first groove type being different than the magnetic properties of the scale member in the locality of grooves of the second groove type, wherein the scale member carries absolute position information in the form of at least one codeword comprising a sequence of data bits, wherein each of the data bits is provided by a groove of the scale member, the data bit taking a first value if the groove is of the first groove type and a second value if the groove is of the second groove type. The magnetic scale may further include any one or more of the features described above.

Figure 2:
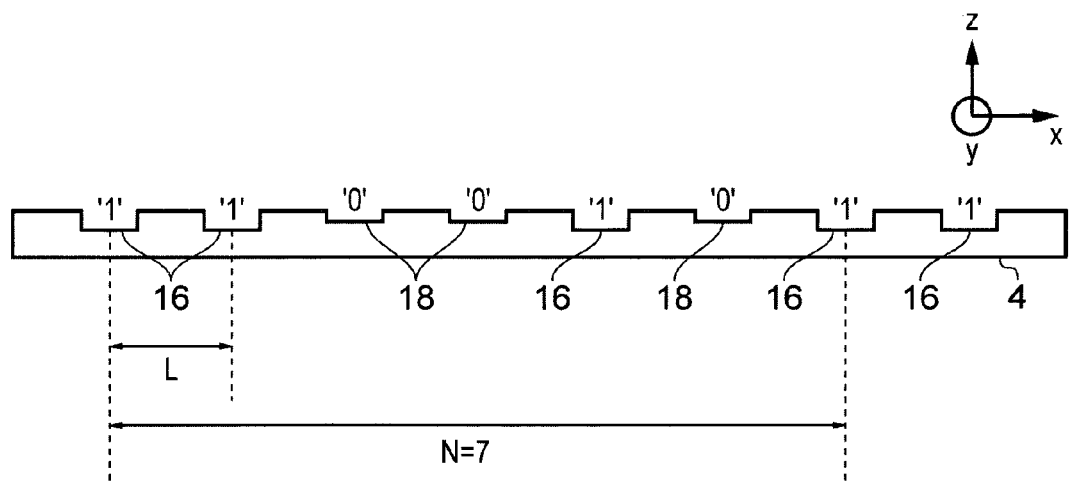
Figure 3:
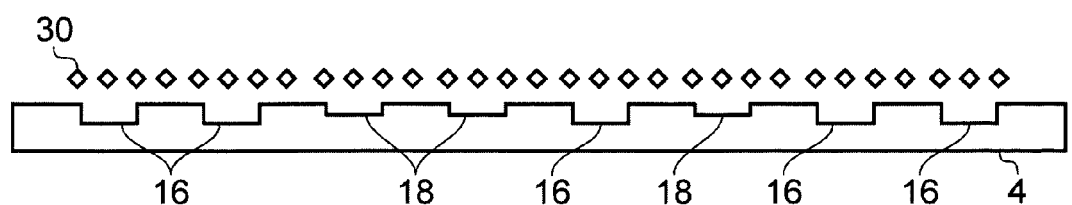
Figure 4:
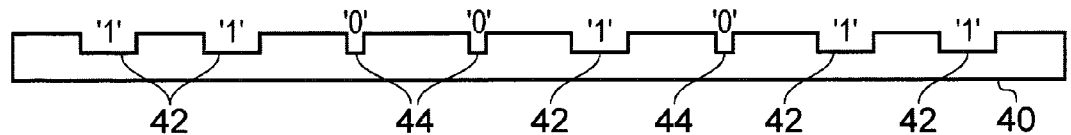
Figure 5:
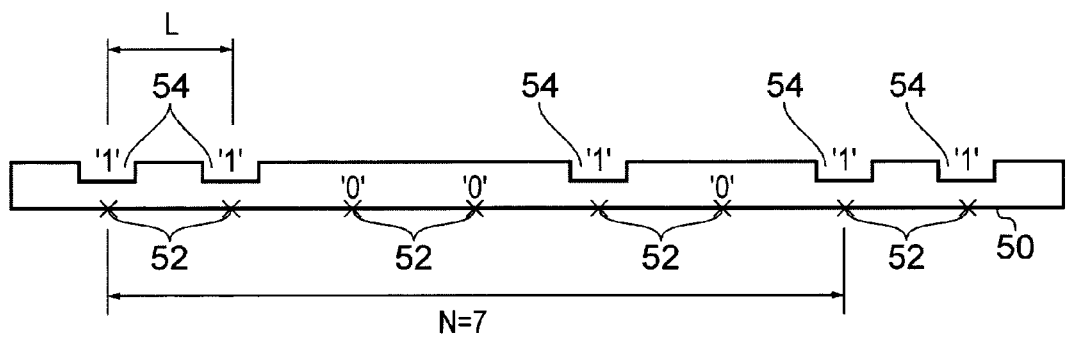
Figure 6:
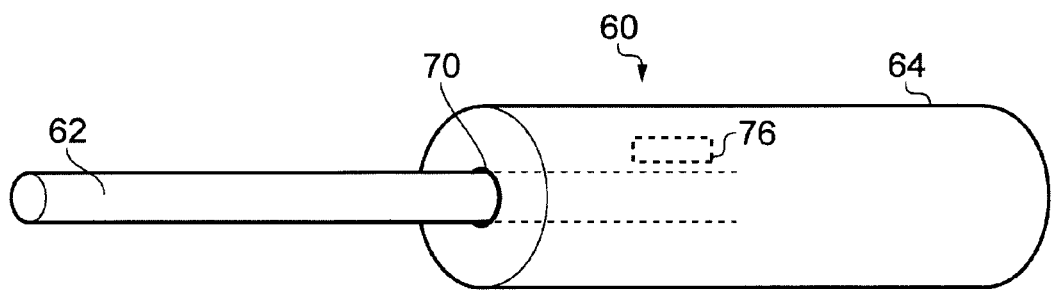
Figure 7:
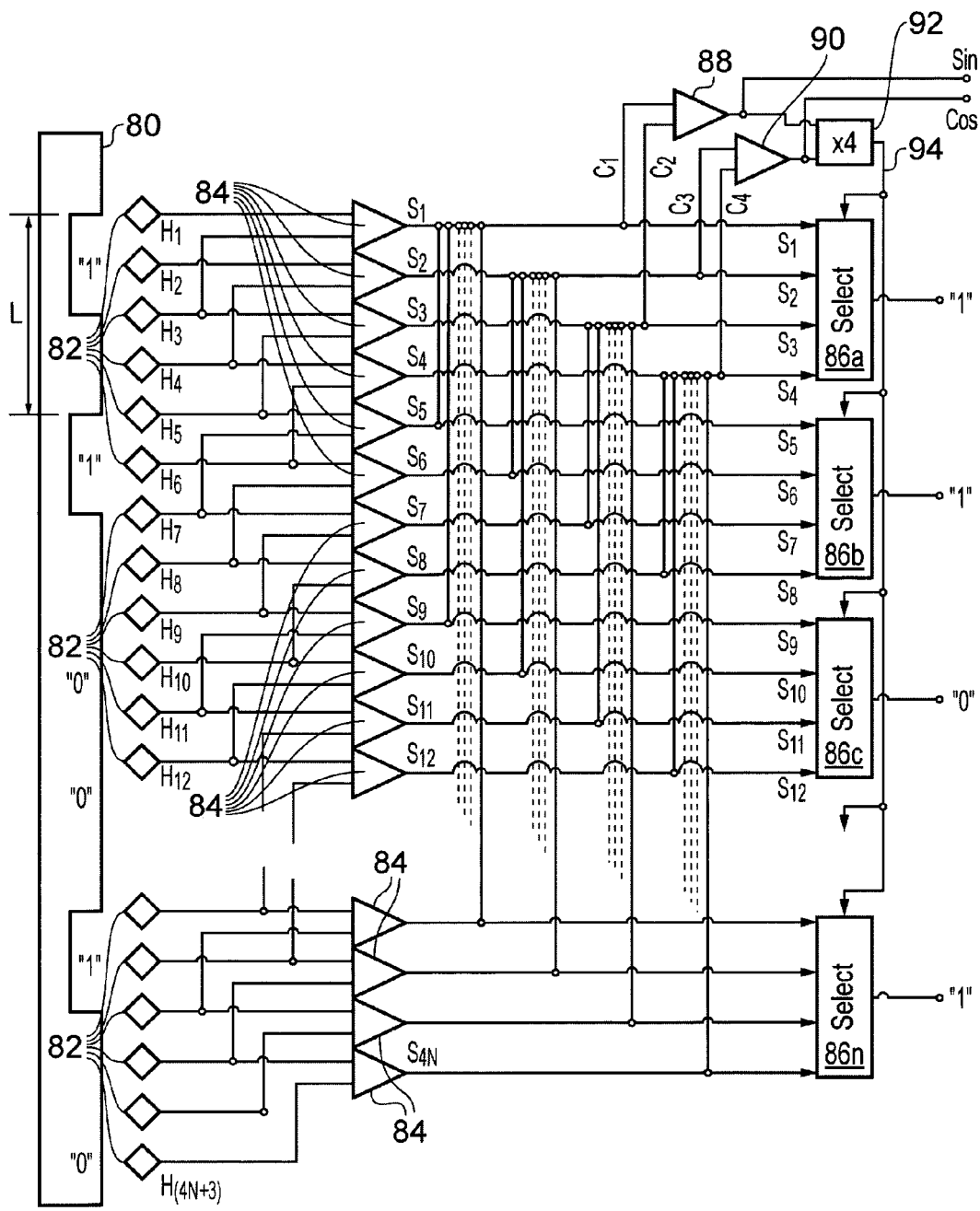
Figure 8:
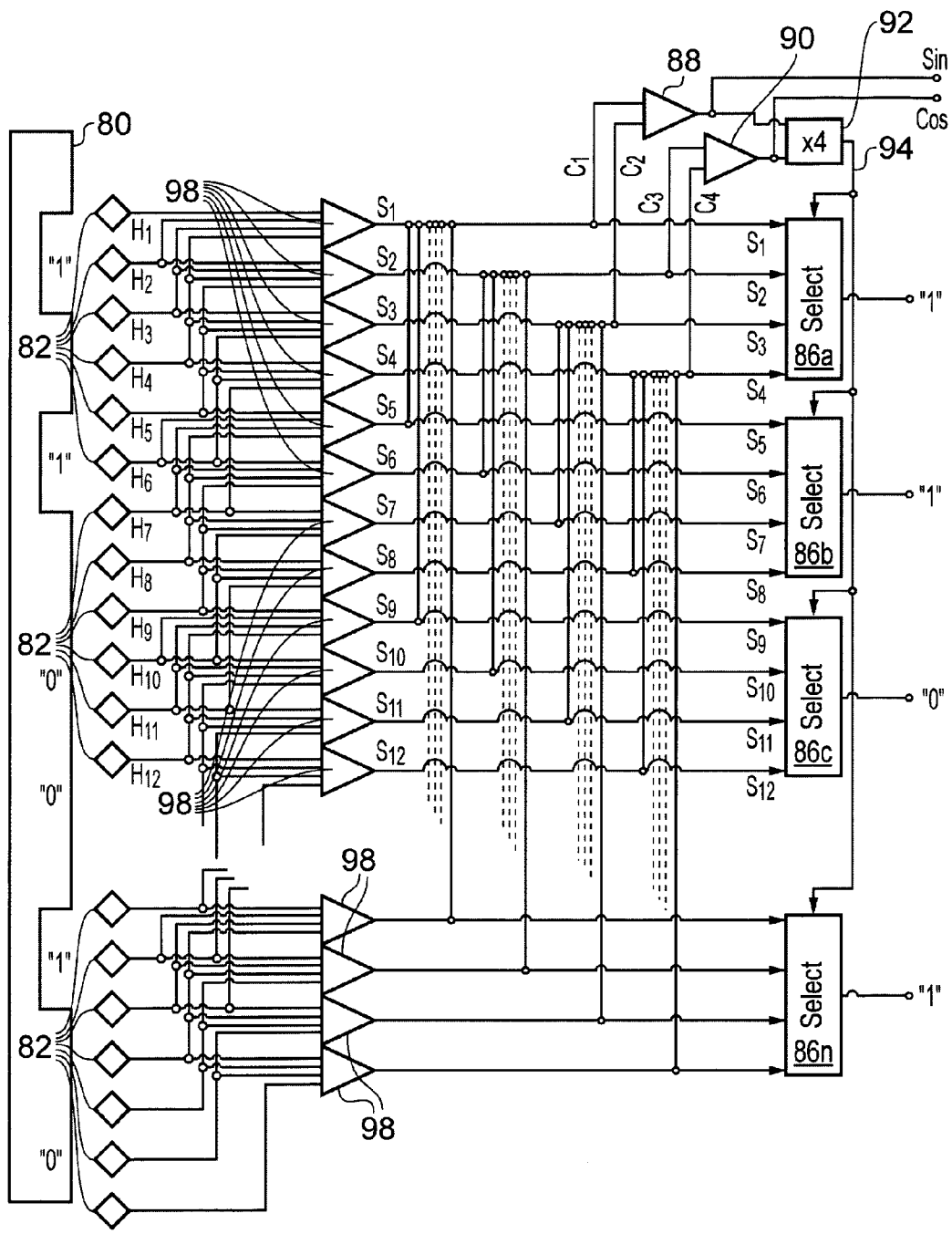

The invention will now be described, by way of example only, with reference to the accompanying drawings in which;

FIG. 1 illustrates a magnetic scale reader unit and a magnetic scale or carrier, FIG. 2 illustrates a scale having a series of grooves of two different groove depths, FIG. 3 illustrates thirty-one Hall sensors arranged to read the scale of FIG. 2, FIG. 4 illustrates a scale having a series of grooves of two different groove widths, FIG. 5 illustrates a scale in which certain grooves are omitted to define absolute position information, FIG. 6 shows a rod that forms a scale having a series of grooves of two different groove depths, FIG. 7 illustrates a first readhead circuit, and FIG. 8 illustrates a second readhead circuit.

Referring to FIG. 1, an encoder device 2 is schematically illustrated that comprises a ferromagnetic scale or carrier 4 having a series of markers or grooves (not shown) and a magnetic scale reader unit 6. The scale reader unit 6 comprise a permanent magnet 8 and a sensor substrate 10 carrying multiple (e.g. thirty-one) Hall sensors. The Hall sensors are uniformly spaced apart in a line along the x-axis and the sensor substrate 10 is arranged to lie substantially parallel to the scale 4. The scale reader unit 6 also comprises electronic processing circuitry which is not shown in FIG. 1 for clarity.

FIG. 2 is an expanded view of a section of the scale 4 that is schematically illustrated in FIG. 1. The scale 4 comprises a substrate formed from ferromagnetic material that includes a series of grooves. The grooves are spaced apart by substantially equal distances along the length of the scale 4. Full depth grooves 16 and reduced (half) depth grooves 18 are formed in the substrate to define different bits of binary data. For example, a full depth groove may define a logical "1" whilst a half depth groove defines a logical "0". The grooves have a bit length L that can be defined as the smallest distance between the centre of two grooves. A binary word (of word length N) can then be built up from an appropriate sequence of N (e.g. seven) full and half depth grooves. The scale 4 thus comprises a series of such words, preferably arranged so that any sub-sequence of bits of the defined word length only appears once on the scale 4. A skilled person would be aware of the numerous technique that could be used to form the grooves; e.g. etching, cutting, laser beam evaporating etc.

Referring to FIG. 3, the thirty-one Hall sensors 30 of the scale reader unit are illustrated when adjacent a section of the scale 4. The sensors 30 are uniformly arranged in a line and detect variations in the magnetic field of the associated permanent magnet (not shown in FIG. 3) that are caused by the grooves 16 and 18 formed in the substrate. The sensor arrangement shown in FIG. 3 comprises four Hall sensors per bit length L of the scale. For the alignment of the sensors and scale shown in FIG. 3, eight data bits can be read from the scale. The provision of thirty-one Hall elements ensures that at least seven data bits can always be read from the scale (i.e. a whole word in this example) irrespective of the position of the readhead unit relative to the scale. In this manner, absolute position can be measured for any relative position of the scale and scale reader unit.

The electronics of the readhead unit; which are described in more detail below with reference to FIGS. 7 and 8, evaluate the signals from each of the Hall sensors 30. The sequence of different grooves types that are present on the section of scale adjacent the readhead unit can thus be determined allowing a binary data sequence or word to be determined. For the section of scale shown in FIGS. 2 and 3, the readhead unit would thus extract the binary code sequence "1100101". This sub-sequence can then be compared to a look-up table storing information on the location of the various bit patterns on the scale and thus provides a measure of the absolute position of the scale relative to the readhead. The basic resolution of the absolute position determined in this manner equals one bit length (L) and in the best case it can be increased to the spacing of the sensors.

To explain the operation of the readhead, the signal from each of the various Hall sensors can be denoted as;

$$H_i; i=1 \ldots (4 \cdot N+3) \qquad (1)$$

wherein N is the word length of the binary sequence and there are four Hall sensors per bit length (L). Although four Hall sensors per bit length are described in the present example, more or fewer sensors per bit length could be provided.

Absolute position information is extracted from the Hall sensor signals ($H_i$) by firstly generating a plurality of summed signals ($S_i$). Two examples of suitable summation schemes are outlined below, but other summation schemes could be used.

A first example of a summation scheme that can be used to generate summed signals ($S_i$) from the Hall sensor signals ($H_i$) can be described as follows;

$$S_i = H_i - H_{i+2}; i=1 \ldots 4 \cdot N \qquad (2)$$

Alternatively, a second summation scheme may be used:

$$S = H_i - H_{i+1} - H_{i+2} + H_{i+3}; i=1 \ldots (4 \cdot N) \qquad (3)$$

In each example, a series ($S_1$ to $S_{4\cdot N}$) of summed signals are produced. The binary value of the data bits encoded in the associated scale can then be obtained from the values of an appropriate set of such summed signals. For example, the value of a first absolute data bit may be found from an appropriate one of the summed signal $S_1$-$S_4$, the value of a second absolute data bit may be found from one of the summed signal $S_5$-$S_8$, etc. Extracting absolute data from such summed signals in this manner is described in detail with reference to FIGS. 7 and 8 below.

In addition to extracting absolute data, it has been found that the summed signals ($S_i$) can also generate two periodic (sin/cos) signals that can be used to increase the resolution of the encoder. These signals are analogous to the incremental (quadrature phase) signals produced in incremental systems by directly combining the outputs of the Hall sensors, but are instead extracted from a combination of the summed signals that are used to generate absolute data. It should be noted that, for generating such incremental signals, the second summation scheme of equation (3) is typically preferred as it reduces the effects of any inhomogeneity in the magnetic field of the permanent magnet to a greater extent than the first scheme of equation (2). However, either summation scheme can be used.

The summed signals ($S_i$) produced by either of the above described summation schemes can be used to generate two periodically varying signals (Sin and Cos) that each have a period equal to the bit length (L) via the expressions:

$$\text{Sin} = \sum_{i=1}^{N} S_{(i-1)\cdot 4+1} - \sum_{i=1}^{N} S_{(i-1)\cdot 4+3} \qquad (4)$$

and

-continued $$Cos = \sum_{i=1}^{N} S_{(i-1)\cdot 4+2} - \sum_{i=1}^{N} S_{(i-1)\cdot 4+4} \quad (5)$$

It is also possible to generate such sine and cosine signals from the expressions:

$$Sin = \sum_{i=1}^{N} S_{(i-1)\cdot 4+1} \quad (6)$$

and $$Cos = \sum_{i=1}^{N} S_{(i-1)\cdot 4+2} \quad (7)$$

The Sin and Cos(i.e. quadrature phase) signals of equations (4) and (5) and of equations (6) and (7) thus provide information about the relative position of the readhead and associated scale. Interpolation of such quadrature phase signals, e.g. using interpolation techniques employed for incremental encoders, can provide positional information having a finer resolution than the bit length. In particular, it has been found that an interpolation factor of up to around 500 can be employed. The Sin and Cos signals described above can thus be used to greatly increase the resolution of the position of the encoder relative to the scale.

The combination of incremental (quadrature phase) and absolute data derived from the same Hall sensor elements reading the same scale track, thus provides a high resolution absolute encoder. The absolute code words provide coarse position information whilst the Sin/Cos signals are interpolated to provide much finer (sub-bit length) resolution. In particular, the interpolated incremental position measurement information is added to coarse absolute position information to provide a resultant (high resolution) absolute position measurement.

The above described method has the advantage of not requiring two discrete tracks of markers. The single track does not, however, have a completely periodic variation in magnetic properties along its length thereby affecting the amplitude of the quadrature phase (Sin and Cos) signals. In other words, the use of full and half depth grooves to encode the absolute position data has an effect on the amplitude of the quadrature phase (Sin and Cos) signals thereby reducing the interpolation factor that can be applied when obtaining the incremental position data.

The scale pattern shown in FIGS. 2 and 3, which comprises full and half depth grooves, has been found to have only a minimal effect on the amplitude of the Sin and Cos signal whilst allowing the different groove types to be readily identified. In particular, the Sin and Cos signals generated when reading such a scale vary in amplitude by no more than 50%.

It should also be noted that varying the groove depth is only one way in which absolute data may be encoded without significantly degrading the Sin and Cos signals.

Referring to FIG. 4, an alternative scale 40 is illustrated having a series of grooves having centre points that are regularly spaced along the scale. A full width groove 42 is used to encode, say, a logical "1" whilst a half-width groove 44 is used to encode a logical "0". This arrangement has also been found to result in a variation in the amplitude of the Sin and Cos signals generated when reading such a scale by no more than 50%.

It can thus be seen that the exact form of the different groove types is immaterial. It is simply necessary for the two different types of groove to provide measurably different magnetic properties that can be sensed by the associated readhead whilst degrading the Sin and Cos signals by the least amount possible. The two different types of groove could thus vary in both width and depth. Alternatively, the different groove types could have different cross-sectional profiles that provide the measurable difference in magnetic properties. The different groove types could also be provided by using a plurality of different sub-grooves (e.g. dots or fine lines) or by forming different groove types by infilling grooves with materials of different magnetic permeability. Although a binary arrangement is shown, it would also be possible to provide three or more different types of grooves that could be distinguished from one another. In such a manner, the length of codeword could be reduced.

Referring to FIG. 5, it is also possible to encode the necessary absolute information in the scale by simply omitting grooves from the periodic sequence to encode the absolute data bits. The scale 50 shown in FIG. 5 thus comprises a regular series of potential groove locations 52. A groove 54 formed at such a potential groove location indicates a logical "1" and omission of such a groove indicates a logical "0". It has been found that such an arrangement can be used, without degrading the quadrature phase signals, provided that the sequence of data bits is controlled to prevent too many adjacent zeros being encoded. In such a system, an interpolation factor of around 20-30 can be used.

Referring to FIG. 6, a preferred application of the above described encoder scale arrangement is illustrated. In particular, the use of a single scale track to encode both incremental and absolute position data can be advantageously used to measure the position of pistons in hydraulic cylinders or the like.

FIG. 6 shows a hydraulic cylinder 60 that incorporates a piston rod 62 that is slideable within a pressurised cylinder casing 64. A supply of hydraulic fluid can be pumped into and out of the casing 64 therefore causing the piston to advance and retract relative to the casing 64. A fluid seal 70 is provided on the casing 64 to prevent leakage of hydraulic fluid.

It is desirable to determine the absolute position of the piston rod 62 relative to the casing 64; for example, in case power is momentary lost or on start-up. It is, however, usual for the piston rod 62 to be freely rotatable relative to the casing 64. The use of prior art systems in which incremental and absolute tracks are placed side-by-side can thus be seen to be unsuitable for such an application. In particular, rotation of the piston rod would cause misalignment between the incremental and absolute tracks and their respective readheads.

The piston rod 62 of FIG. 6 is thus provided with circumferentially extending grooves (not shown) that encode a combined absolute/incremental scale of the type illustrated in FIG. 2. A reader unit 76, similar to the reader unit 6 of FIG. 1, can then be placed adjacent the piston rod 62 for reading the absolute position of the rod relative to the cases. These readings are thus unaffected by any piston rod rotation.

It should be noted that the grooves formed in the scale need not be empty or fluid filled. If a magnetic scale substrate is used, the grooves may be filled with a non-magnetic solid material (e.g. copper, chromium, ceramic etc). Providing a non-magnetic scale substrate and magnetic groove fillings would also be possible. Filling the grooves in this manner still provides the necessary variation in magnetic properties but also allows a smooth scale surface to be provided. Providing such a smooth surface is especially advantageous for hydraulic cylinders where a tight fluid seal 70 with the scale carrying piston rod is required.

Referring now to FIGS. 7 and 8, the electronic circuitry of scale reader units of the type described with reference to FIG. 3 are illustrated when reading a scale of the type described with reference to FIG. 5.

FIG. 7 illustrates a scale 80 encoding a series of absolute data bits of bit length L. An associated scale reader is also illustrated that comprises a linear array of Hall sensors 82. The Hall sensors 82 are evenly spaced apart from one another and four Hall sensors are provided per bit length L of the scale. Each Hall sensor 82 generates an output signal; these Hall signals can be denoted $H_i$ using the terminology introduced in equation (1) above.

A plurality of summing devices 84 are also provided to generate summed (difference) signals $S_1$ from the Hall sensor output signals $H_i$ as defined in equation (2) above. In particular, it can be seen that the first summed signal $S_1$ is generated from the difference between the first Hall sensor signal $H_1$ and the third Hall sensor signal $H_3$, the second summed signal $S_2$ is generated from the difference between the second Hall sensor signal $H_2$ and the fourth Hall sensor signal $H_4$, etc. In other words, each summed signal S is generated from signals produced by a pair of Hall sensors that are spaced apart by half the bit length.

A plurality of signal selectors $86a$-$86n$ (collectively referred to as the signal selectors 86) are provided to receive the summed signals produced by the plurality of summing devices 84. The number of signal selectors 86 is chosen to be equal to the word length that is to be read from the scale. Each signal selector 86 receives four of the summed signals. In particular, the first signal selector $86a$ receives summed signals $S_1$ to $S_4$, the second signal selector $86b$ receives signals $S_5$ to $S_8$, the third signal selector $86c$ receives signals $S_9$ to $S_{12}$ etc. The purpose of each signal selector 86 is to select which one of the four summed signals it receives should be used to determine the presence or absence of a groove in the scale and therefore whether that data bit encodes a logical "1" or "0" value. This selection process, which relies on receipt of the coarse interpolated position signal described below, means that the data encoded in the scale 80 can be read with the scale located in an arbitrary position relative to the array of Hall sensors 82. A parallel series of data bits corresponding to the word encoded in the scale are thus output by the signal selectors 86.

In addition to being used to generate absolute data, the summed signals S are also combined in accordance with equations (4) and (5) or equations (6) and (7) above to generate a pair of sin/cos signals. In other words, the summed signals $S_i$ used to provide the absolute data information are also used to generate an incremental signal.

In particular, a first combined signal $C_1$ is generated from the sum of every fourth summed signal starting at $S_1$; i.e. $C_1$ is produced by combining summed signals $S_1, S_5, S_9, S_{13}$ etc. A second combined signal $C_2$ is generated from the sum of every fourth summed signal starting at $S_3$ (i.e. the summation of $S_3, S_7, S_{11}, S_{15}$ etc). A third combined signal $C_3$ is generated from the sum of every fourth summed signal starting at $S_2$ (i.e. the summation of $S_2, S_6, S_{10}, S_{14}$ etc). A fourth combined signal $C_4$ is generated from the sum of every fourth summed signal starting at $S_4$ (i.e. the summation of $S_4, S_8, S_{12}, S_{16}$ etc). A first summing device 88 provides a sin signal from the difference between the first and second combined signals $C_1$ and $C_2$ and a second summing device 90 provides a cosine signal from the difference between the third and fourth combined signals $C_3$ and $C_4$.

An interpolator unit 92 receives the sine and cosine signals from the first and second summing devices 88 and 90. The interpolator unit 92 applies an interpolation factor of four and thus outputs a coarse incremental signal 94 that indicates the coarse relative phase of the alignment between the scale 80 and the array of Hall sensors 82 within a phase quadrant (i.e. with a 90° phase range). Each signal selector 86 receives this coarse incremental signal and uses it to determine which one of the four summed signals that it receives is appropriately aligned so as to read the required data bit of the scale. In the example shown in FIG. 7, the summed signal $S_2$ is derived from the difference in magnetic field intensity of the second and fourth Hall sensors (i.e. signals $H_2$ and $H_4$) and thus provides an indication that the scale has a groove encoding logical "1" as a first data bit.

The circuit of FIG. 7 thus outputs N data bits (0 s or 1 s) that correspond to the data word encoded in the scale 80 plus a pair of sin/cos signals. A look-up table is used to establish the absolute position associated with the N-bit word read from the scale. The sin/cos signals are interpolated to obtain a finer (sub-bit length) measure of the (incremental) position of the scale relative to the Hall sensors 82 within one bit length. If an interpolation factor of, say, 30 is used the relative (incremental) position of the scale relative to the Hall sensors 82 can thus be found to within one thirtieth of the bit length. The (sub-bit length) incremental position is added to the absolute position value thereby providing a higher resolution, absolute, measure of position than would be possible using the absolute data alone. This higher resolution absolute position information may be output using, for example, a serial data transfer protocol.

FIG. 8 illustrates a variant of the circuit of FIG. 7 in which like components are assigned like reference numerals.

The circuit of FIG. 8 is similar to that shown in FIG. 7 but implements the second summation scheme defined in equation (3) above. Instead of using the summing devices 84 of FIG. 7 that provides summed signal $S_i$ from a pair of Hall sensor signals, the circuit of FIG. 8 uses a plurality of alternative summing devices 98 that receive signals from four Hall sensors to provide the summed signals $S_i$. The circuit shown in FIG. 8 is of greater electronic complexity than that shown in FIG. 7, but harmonic distortions of the sin and cos signals resulting from variations in the intensity of the magnetic field generated by the magnet are reduced.

The invention claimed is:

1. A magnetic scale for magnetic encoder apparatus, comprising:
    a scale member comprising a plurality of grooves, the scale member defining a passive magnetic scale track that can be read by an associated magnetic scale reader unit that comprises a magnet and a plurality of magnetic field strength sensors, the passive magnetic scale track having local magnetic permeability variations that affect the magnetic field generated by the magnet of the associated magnetic scale reader unit,
    the plurality of grooves comprising grooves of at least a first groove type and a second groove type, the magnetic properties of the scale member in the locality of grooves of the first groove type being different than the magnetic properties of the scale member in the locality of grooves of the second groove type,
    wherein the scale member carries absolute position information in the form of at least one codeword comprising a sequence of data bits, wherein each of the data bits is provided by a groove of the scale member, the data bit taking a first value if the groove is of the first groove type and a second value if the groove is of the second groove type, wherein the midpoints of the plurality of grooves are substantially equidistantly spaced apart along the length of the scale member.

2. A magnetic scale according to claim 1, wherein grooves of the first groove type have a different depth than grooves of the second groove type.

3. A magnetic scale according to claim 1, wherein grooves of the first groove type have a different width than grooves of the second groove type.

4. A magnetic scale according to claim 1, wherein grooves of the first groove type have a different cross-sectional profile than grooves of the second groove type.

5. A magnetic scale according to claim 1, wherein a groove of the first groove type defines a binary data bit having a logical "0" value and a groove of the second groove type defines a binary data bit having a logical "1" value.

6. A magnetic scale according to claim 1, wherein each codeword comprises a binary codeword formed from a series of at least two binary data bits.

7. A magnetic scale according to claim 1, wherein the scale member comprises magnetic material.

8. A magnetic scale according to claim 1, wherein the scale member is elongate thereby providing a linear magnetic scale.

9. A magnetic scale according to claim 1, wherein the scale member comprises a rod and each of the plurality of grooves extend circumferentially around the rod.

10. A magnetic scale according to claim 1, wherein the plurality of grooves are empty.

11. A magnetic scale according to claim 1, wherein the plurality of grooves are at least partially filled with one or more materials.

12. An encoder apparatus comprising:
a magnetic scale; and
a magnetic scale reader unit,
the magnetic scale reader unit comprising a magnet and a plurality of magnetic field strength sensors,
the magnetic scale comprising:
a scale member comprising a plurality of grooves, the scale member defining a passive magnetic scale track that can be read by the magnetic scale reader unit,
the plurality of grooves comprising grooves of at least a first groove type and a second groove type, the magnetic properties of the scale member in the locality of grooves of the first groove type being different than the magnetic properties of the scale member in the locality of grooves of the second groove type,
wherein the scale member carries absolute position information in the form of at least one codeword comprising a sequence of data bits, wherein each of the data bits is provided by a groove of the scale member, the data bit taking a first value if the groove is of the first groove type and a second value if the groove is of the second groove type,
wherein the midpoints of the plurality of grooves are substantially equidistantly spaced apart along the length of the scale member.

13. Encoder apparatus according to claim 12, wherein the midpoints of the grooves of the magnetic scale are spaced apart by a bit length and the magnetic scale reader comprises a plurality of spaced apart magnetic field strength sensors, wherein the spacing of the magnetic field strength sensors is arranged so that M magnetic field strength sensors are provided per bit length, wherein M is an integer value greater than or equal to one.

14. Encoder apparatus according to claim 13, wherein the magnetic scale comprises a plurality of codewords, each codeword comprising N data bits defined by N spaced apart grooves, wherein the plurality of spaced apart magnetic field strength sensors comprises sufficient magnetic field strength sensors to simultaneously read at least N data bit, wherein N is an integer value greater than or equal to two.

15. Encoder apparatus according to claim 12, comprising circuitry to generate absolute and incremental data from the signals produced by the plurality of magnetic field strength sensors.

* * * * *